United States Patent
Chen et al.

(10) Patent No.: US 11,157,818 B2
(45) Date of Patent: Oct. 26, 2021

(54) MODEL TRAINING METHOD AND APPARATUS BASED ON GRADIENT BOOSTING DECISION TREE

(71) Applicant: Advanced New Technologies Co., Ltd., George Town (KY)

(72) Inventors: Chaochao Chen, Hangzhou (CN); Jun Zhou, Hangzhou (CN)

(73) Assignee: ADVANCED NEW TECHNOLOGIES CO., LTD., George Town (KY)

( * ) Notice: Subject to any disclaimer, the term of this patent is extended or adjusted under 35 U.S.C. 154(b) by 0 days.

(21) Appl. No.: 17/158,451

(22) Filed: Jan. 26, 2021

(65) Prior Publication Data

US 2021/0264291 A1 Aug. 26, 2021

Related U.S. Application Data

(63) Continuation of application No. PCT/CN2019/101335, filed on Aug. 19, 2019.

(30) Foreign Application Priority Data

Oct. 17, 2018 (CN) .......................... 201811210339.9

(51) Int. Cl.
*G06N 5/00* (2006.01)
*G06K 9/62* (2006.01)
(Continued)

(52) U.S. Cl.
CPC ........... *G06N 5/003* (2013.01); *G06K 9/6256* (2013.01); *G06N 20/00* (2019.01); *G06N 20/10* (2019.01);
(Continued)

(58) Field of Classification Search
CPC .......... G06N 5/02; G06N 5/025; G06N 5/027; G06N 5/003; G06N 20/00; G06N 20/10; G06N 20/20; G06K 9/6256
See application file for complete search history.

(56) References Cited

U.S. PATENT DOCUMENTS

2019/0164084 A1* 5/2019 Gulin ...................... G06N 20/00
2020/0089684 A1* 3/2020 Gotmanov ............. G06N 5/003

FOREIGN PATENT DOCUMENTS

CN 105868847 A 8/2016
CN 106548210 A 3/2017
(Continued)

OTHER PUBLICATIONS

GBDT, URL=https://www.zybuluo.com/evilking/note/946535, May 1, 2018, downloaded Mar. 16, 2021, 10 pages.
(Continued)

*Primary Examiner* — Shane D Woolwine
(74) *Attorney, Agent, or Firm* — Seed IP Law Group LLP (57) ABSTRACT

Disclosed are a model training method and apparatus based on gradient boosting decision tree (GBDT). A GBDT algorithm flow is divided into two stages. In the first stage, labeled samples are obtained from a data domain of a service scenario similar to a target service scenario to sequentially train several decision trees, and training residual generated after the training in the first stage is determined; in the second stage, labeled samples are obtained from a data domain of the target service scenario, and several decision trees continue to be trained based on the training residual. Finally, a model applied to the target service scenario is actually obtained by integrating the decision trees trained in the first stage with the decision trees trained in the second stage.

18 Claims, 4 Drawing Sheets

(51) Int. Cl.
  *G06N 20/20*  (2019.01)
  *G06N 20/10*  (2019.01)
  *G06N 20/00*  (2019.01)
  *G06N 5/02*   (2006.01)

(52) U.S. Cl.
  CPC .............. *G06N 20/20* (2019.01); *G06N 5/02* (2013.01); *G06N 5/025* (2013.01); *G06N 5/027* (2013.01)

(56) References Cited

FOREIGN PATENT DOCUMENTS

| | | |
|---|---|---|
| CN | 107944874 A | 4/2018 |
| CN | 109472296 A | 3/2019 |
| WO | 2017/129030 A1 | 8/2017 |

OTHER PUBLICATIONS

Chen et al., "XGBoost: A Scalable Tree Boosting System," *Proceedings of the 22nd ACM SIGKDD International Conference on Knowledge Discovery and Data Mining*, 2016.

International Search Report and Written Opinion, dated Oct. 29, 2019, for International Application No. PCT/CN2019/101335, 5 pages.

Gradient Boosting Tree, URL=https://zhuanlan.zhihu.com/p/40096769, download date Apr. 21, 2021, 12 pages.

Zhuang at al., "Survey on Transfer Learning Research," *Journal of Software*, 26(1):26-39, 2015.

Gao et al., Deep Learning: From Entry to Actual Combat, China Railway Publishing House, Beijing, 2018, p. 197-198.

\* cited by examiner

MODEL TRAINING METHOD AND APPARATUS BASED ON GRADIENT BOOSTING DECISION TREE

BACKGROUND

Technical Field

Implementations of the present specification pertain to the field of information technologies, and in particular, to a model training method and apparatus based on gradient boosting decision tree (GBDT).

Description of the Related Art

Machine learning is an important branch of computer technologies. Many machine learning methods require proper training based on relevant data in particular context. In many cases, when a prediction model that is designed for applying to a certain service scenario needs to be trained, a large amount of data needs to be obtained from a data domain of this service scenario for labeling, so as to obtain labeled samples for model training. If there are only a small number of labeled samples, it is usually impossible to obtain a qualified model. It should be noted that a data domain of a certain service scenario is actually a set of service data generated based on the service scenario.

However, in practice, there may be insufficient accumulation of data in some service scenarios. Consequently, it can be impossible to obtain enough labeled samples from the data domain of a certain service scenario when a model designed for applying to the service scenario needs to be trained, and no qualified model can be obtained.

BRIEF SUMMARY

Implementations of the present specification provide a model training method and apparatus based on GBDT. The techniques improves, among others, training data sufficiency. The technical solutions are as follows.

According to a first aspect of the implementations of the present specification, a model training method based on GBDT is provided for training a target model to be applied to a target service scenario. The method includes obtaining a first sample set, the first sample set being a set of labeled samples obtained from a data domain of a source service scenario, and the source service scenario being a service scenario similar to the target service scenario; executing a GBDT algorithm flow by using the first sample set, and sequentially training at least one decision tree until a predetermined or dynamically-determined training suspension condition is met; determining training residual based on the decision trees trained by using the first sample set; obtaining a second sample set, the second sample set being a set of labeled samples obtained from a data domain of the target service scenario; and continuing to execute the GBDT algorithm flow based on the training residual by using the second sample set, and sequentially training at least one decision tree until a predetermined or dynamically-determined training stop condition is met, where the target model is obtained by integrating the trained decision trees.

According to a second aspect of the implementations of the present application, a prediction method is provided, including obtaining to-be-predicted data from a data domain of a target service scenario; determining, based on the to-be-predicted data, a model input feature corresponding to the to-be-predicted data; and inputting the model input feature into a prediction model that is applied to the target service scenario, to output a prediction result, the prediction model being obtained by using the method according to the first aspect.

According to a third aspect of the implementations of the present specification, a model training apparatus based on GBDT is provided for training a target model to be applied to a target service scenario. The apparatus includes a first acquisition module, configured to obtain a first sample set, the first sample set being a set of labeled samples obtained from a data domain of a source service scenario, and the source service scenario being a service scenario similar to the target service scenario; a first training module, configured to execute a GBDT algorithm flow by using the first sample set, and sequentially train at least one decision tree until a predetermined or dynamically-determined training suspension condition is met; a calculation module, configured to determine training residual based on the decision trees trained by using the first sample set; a second acquisition module, configured to obtain a second sample set, the second sample set being a set of labeled samples obtained from a data domain of the target service scenario; and a second training module, configured to continue to execute the GBDT algorithm flow based on the training residual by using the second sample set, and sequentially train at least one decision tree until a predetermined or dynamically-determined training stop condition is met, where the target model is obtained by integrating the trained decision trees.

According to a fourth aspect of the implementations of the present application, a prediction apparatus is provided, including an acquisition module, configured to obtain to-be-predicted data from a data domain of a target service scenario; a determining module, configured to determine, based on the to-be-predicted data, a model input feature corresponding to the to-be-predicted data; and an input module, configured to input the model input feature into a prediction model that is applied to the target service scenario, to output a prediction result, the prediction model being obtained by using the method according to the first aspect.

In the technical solution according to implementations of the present specification, a GBDT algorithm flow is divided into two stages. In the first stage, labeled samples are obtained from a data domain of a service scenario similar to a target service scenario to sequentially train several decision trees, and training residual generated after the training in the first stage is determined; and in the second stage, labeled samples are obtained from a data domain of the target service scenario, and several decision trees continue to be trained based on the training residual. Finally, a model applied to the target service scenario is actually obtained by integrating the decision trees trained in the first stage with the decision trees trained in the second stage. Through the implementation of the present specification, although the data accumulated in the target service scenario is insufficient, the model applied to the target service scenario can be practically and efficiently trained by using the data of the service scenario similar to the target service scenario. After testing, an effective model can be obtained. The subject matter disclosed herein improves machine learning technology, enables earlier and effective training of various prediction models even if specific, contextual data has not been accumulated to a level sufficient for traditional model training purposes. Additionally, the technology disclosed herein can also be applied to predictive model training when there is a sufficient amount of specific, contextual data, as an alternative or competing option to traditional training.

It should be understood that the above general description and the following detailed description are only exemplary and illustrative and do not limit the implementation of the present specification.

In addition, any of the implementations of the present specification does not need to achieve all the above effects.

BRIEF DESCRIPTION OF THE SEVERAL VIEWS OF THE DRAWINGS

To describe the technical solutions in the implementation of the present specification or in the existing technologies more clearly, the following briefly describes accompanying drawings required for describing the implementations or the existing technologies. Apparently, the accompanying drawings in the following description show merely some implementations of the present specification, and a person of ordinary skill in the art can still derive other accompanying drawings from these accompanying drawings.

DETAILED DESCRIPTION

The present disclosure is based on the transfer learning mechanism in the technical field of machine learning. When a model applied to a target service scenario needs to be obtained, if data accumulated in the target service scenario is insufficient, data accumulated in a service scenario similar to the target service scenario can be used for model training. Illustratively, the similar service scenario and the target service scenario are associated with same data features or a threshold quantity of overlapping data features.

Specifically, the present disclosure combines the transfer learning idea with the GBDT algorithm and improves the GBDT algorithm flow. In the implementation of the present specification, based on the GBDT algorithm flow, data generated in a service scenario similar to a target service scenario is used for training, and after a certain training suspension condition is met, the training is suspended and current training residual is calculated; then, the training is continued based on the training residual by using the data generated in the target service scenario, until a certain training stop condition is met. As such, a trained GBDT model is applied to the target service scenario, so as to achieve a better prediction result.

It should be noted that herein, a service scenario similar to a target service scenario is actually a service scenario similar to or associated with the target service scenario. Herein, the service scenario similar to the target service scenario is called a source service scenario.

For example, assuming that the target service scenario is a male product recommendation scenario, to better recommend products based on ages of male users, a model for predicting the ages of male users needs to be trained. However, because the male product recommendation function has been available for a short time and only a few purchase records of male users are accumulated (various feature information of purchasers and the ages of the purchasers are recorded in the purchase records), it is impossible to obtain enough labeled samples for training. Therefore, a female product recommendation scenario can be used as the source service scenario corresponding to the target service scenario. Because the female product recommendation function has already been available for a long time, and a large number of purchase records of female users have been accumulated, in the implementation of the present specification, a model that is sufficiently effective and used for predicting the ages of male users can be trained by using a small number of purchase records of male users aided with a large number of accumulated purchase records of female users.

To enable a person skilled in the art to better understand the technical solutions in the implementations of the present specification, the following describes the technical solutions in the implementations of the present specification in detail with reference to the accompanying drawings in the implementations of the present specification. Clearly, the described implementations are merely some but not all of the implementations of the present specification. All other implementations obtained by a person of ordinary skill in the art based on the implementations of the present specification shall fall within the protection scope.

The technical solutions according to the implementations of the present specification are described in detail below with reference to the accompanying drawings.

Figure 1:
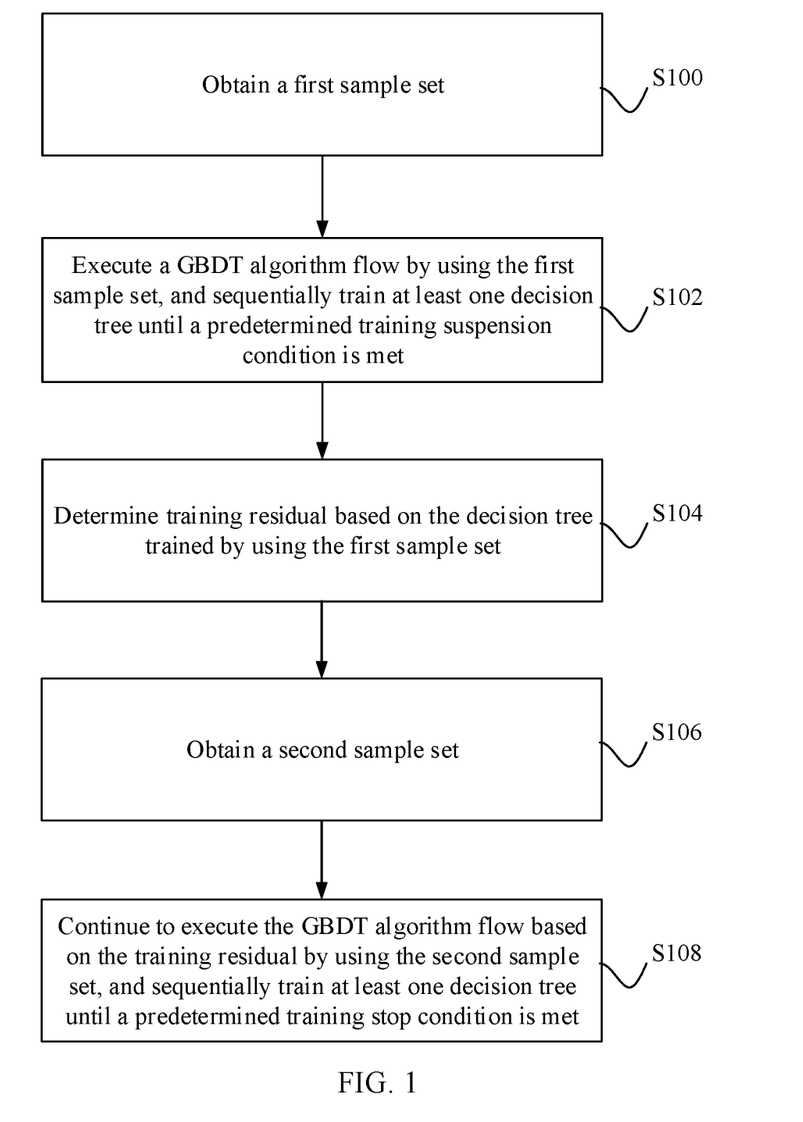
FIG. 1 is a schematic flowchart illustrating a model training method based on GBDT according to an implementation of the present specification.

FIG. 1 is a schematic flowchart illustrating a model training method based on GBDT according to an implementation of the present specification. The method includes the following steps.

S100: Obtain a first sample set.

The purpose of this method is to train a target model applied to a target service scenario.

In the implementation of the present specification, because a large amount of data in a data domain of the source service scenario corresponding to the target service scenario is accumulated, a large amount of service data can be obtained from the data domain of the source service scenario for labeling, to obtain sufficient labeled samples. The first sample set in step S100 is a set of the labeled samples obtained from the data domain of source service scenario.

Still using the above example, the target service scenario is the male product recommendation scenario, while the source service scenario is the female product recommendation scenario. A plurality of labeled samples are obtained from the data domain of the source service scenario. Specifically, several purchase records can be obtained from the purchase records accumulated in the female product recommendation scenario; then feature information such as a purchaser's education background, income, job type and height is extracted from each purchase record to construct a user feature vector corresponding to the purchase record; and then the purchaser's age is extracted from the purchase record as a labeled value of the user feature vector. As such, a labeled sample is obtained.

S102: Execute a GBDT algorithm flow by using the first sample set, and sequentially train at least one decision tree until a predetermined or dynamically-determined training suspension condition is met.

The principle of the GBDT algorithm is first described below.

The GBDT algorithm is a typical ensemble learning algorithm. In the GBDT algorithm flow, some labeled samples are used to train two or more decision trees in sequence, and then the trained decision trees are integrated into a model as a training result.

The first trained decision tree is actually used to fit the labeled value of each labeled sample. After the first decision tree is trained, current training residual can be calculated. The training residual is used to represent a difference between a predicted value of each labeled sample and the labeled value of each labeled sample as of the current training progress. It can be seen that in one GBDT algorithm flow, the training residual is updated once each time one decision tree is trained.

In the GBDT algorithm flow, after the first decision tree is trained, the next decision tree will continue to be trained. Each other decision tree except the first decision tree is used to fit the training residual calculated based on all decision trees before the other decision tree. As such, as the GBDT algorithm flow proceeds, more and more decision trees are trained in sequence, and the training residual will become smaller and smaller. When the training residual is small enough, it means that the model parameters of the current model have met a standard for fitting the labeled values of each labeled sample, and then the training can be ended.

It should also be noted that in the GBDT algorithm, fitting has two meanings:

First, the first trained decision tree is used to fit labeled values of samples. The fitting herein actually means that for the first decision tree, decision tree parameters are trained by using features of the samples as decision tree input and using the labeled values of the samples as decision tree output, so that the decision tree parameters and the decision tree input are matched with the decision tree output as much as possible.

Second, each decision tree in subsequent training is used to fit the training residual calculated based on all previous decision trees. The fitting herein actually means that for each decision tree to be trained later, decision tree parameters are trained by using features of the samples as decision tree input and using the training residual as decision tree output, so that the decision tree parameters and the decision tree input are matched with the decision tree output as much as possible.

In the implementations of the present specification, the GDBT algorithm flow is divided into two stages (the first stage and the second stage). Step S102 is a step performed in the first stage. Specifically, in step S102, a GBDT algorithm flow is executed by using the first sample set, at least one decision tree is sequentially trained, and when a predetermined or dynamically-determined training suspension condition is met, the training is suspended, that is, the training in the first stage is completed.

It should be noted that the training suspension condition can be specified based on actual needs. For example, the training suspension condition can be that the number of the decision trees trained by using the first sample set reaches a first pre-specified or dynamically-determined number. In practice, the timing of suspension of the training in the first stage is determined by limiting the number of decision trees, which is visual and facilitates execution.

As another example, the training suspension condition can be that the training residual calculated based on the trained decision trees falls within a first pre-specified or dynamically-determined threshold interval.

S104: Determine training residual based on the decision trees trained by using the first sample set.

When the training suspension condition is met, the training is suspended, and the current training residual generated in the training process is calculated based on the decision trees trained by using the first sample set.

That is, in step S104, the current training residual is calculated based on all the decision trees trained in the first stage, which also means that the integration of the training results in the first stage is completed.

S106: Obtain a second sample set.

The second sample set is a set of labeled samples obtained from a data domain of the target service scenario.

It should be noted that, generally, the number of labeled samples in the first sample set is significantly greater than that in the second sample set.

It should also be noted that in the implementation of the present specification, the timing of performing step S106 is not limited. Actually, step S106 can be performed before any one of steps S100-S104.

S108: Using the second sample set, continue to execute the GBDT algorithm flow based on the above-described training residual, and sequentially train at least one decision tree until a predetermined or dynamically-determined training stop condition is met.

After the first stage, the training residual needs to be migrated to the second stage. Step S108 is a step performed in the second stage. In the second stage, using the second sample set and based on the training residual, the GBDT algorithm flow continues to be executed. When the predetermined or dynamically-determined training stop condition is met, the training is stopped, so that the training in the second stage is completed.

In step S108, in effect the second sample set is used so as to inherit the training results of the first stage and continue to train decision tree(s).

The first decision tree trained by using the second sample set is to fit the training residual generated in the first stage. Each current decision tree trained by using the second sample set after the training of the first decision tree, is to fit the training residual calculated based on all the decision trees trained before the current decision tree (including the decision tree(s) trained by using the first sample set and the decision tree(s) already trained by using the second sample set).

It should be noted that the second stage will end (namely, training is stopped) when the predetermined or dynamically-determined training stop condition is met. The training stop condition can be specified based on actual needs.

For example, the training stop condition can be that the number of the decision trees trained by using the second sample set reaches a second pre-specified or dynamically-determined number. As another example, the training stop condition can be that the training residual calculated based on the trained decision trees falls within a second pre-specified or dynamically-determined threshold interval. Generally, the value of the right endpoint of the second threshold interval is smaller than the value of the left endpoint of the first threshold interval.

Several decision trees can be trained through steps S100-S108. As such, the trained decision trees can be integrated to obtain the target model applied to the target service scenario.

Specifically, the target model can be a decision tree sequence obtained by sorting the decision trees from first to last based on their generation order.

Based on the model training method shown in FIG. 1, a GBDT algorithm flow is divided into two stages. In the first stage, labeled samples are obtained from a data domain of a service scenario similar to a target service scenario to sequentially train several decision trees, and training residual generated after the training in the first stage is determined; and in the second stage, labeled samples are obtained from a data domain of the target service scenario, and several decision trees continue to be trained based on the training residual. Finally, a model applied to the target service scenario is actually obtained by integrating the decision trees trained in the first stage with the decision trees trained in the second stage. Through the implementation of the present specification, although the data accumulated in the target service scenario is insufficient, the model applied to the target service scenario can be trained by using the data of the service scenario similar to the target service scenario. After testing, a qualified model can be obtained.

In addition, in the implementations of the present specification, labeled samples can be obtained from data domains of more than one source service scenario, to perform training in the first stage. For example, assuming that the target service scenario is a male product recommendation scenario, source service scenarios that can be obtained are a female product recommendation scenario and a children product recommendation scenario, and the training in the first stage in the GBDT algorithm flow is performed by sequentially using the data generated in the two source service scenarios.

Specifically, before step S108, a third sample set can be obtained. The third sample set is a set of labeled samples obtained from a data domain of another source service scenario.

Next, before step S108, using the third sample set and based on the training residual, the GBDT algorithm flow continues to be executed, and at least one decision tree is sequentially trained until a predetermined or dynamically-determined training re-suspension condition is met; and the training residual is re-determined based on the decision trees trained by using the first sample set and the decision trees trained by using the third sample set.

The training re-suspension condition can be specified based on actual needs. For example, the training suspension condition can be that the number of the decision trees trained by using the third sample set reaches a third pre-specified or dynamically-determined number. As another example, the training suspension condition can be that the training residual calculated based on the trained decision trees falls within a third pre-specified or dynamically-determined threshold interval.

That is, in the first stage of the GBDT algorithm flow, the set of labeled samples can be obtained from the data domain of a source service scenario, and the GBDT algorithm flow can be executed. When the training suspension condition is met, the training is suspended, and the current training residual is calculated. Then, based on the training residual, the GBDT algorithm flow continues to be executed by making replacement to use the combination of labeled samples corresponding to another source service scenario. When the training re-suspension condition is met, the training is suspended again, and the current training residual is recalculated.

Then, replacement can also be made with another source service scenarios again to continue the training in the first stage. In conclusion, a person skilled in the art should understand that the following technical solutions should fall within the protection scope of the present invention:

The GBDT algorithm flow is divided into two stages. In the first stage, the GBDT algorithm flow is executed by sequentially using the data generated in at least two source service scenarios, and in the second stage, the GBDT algorithm flow continues to be executed by using the data generated in the target service scenario.

Figure 2:
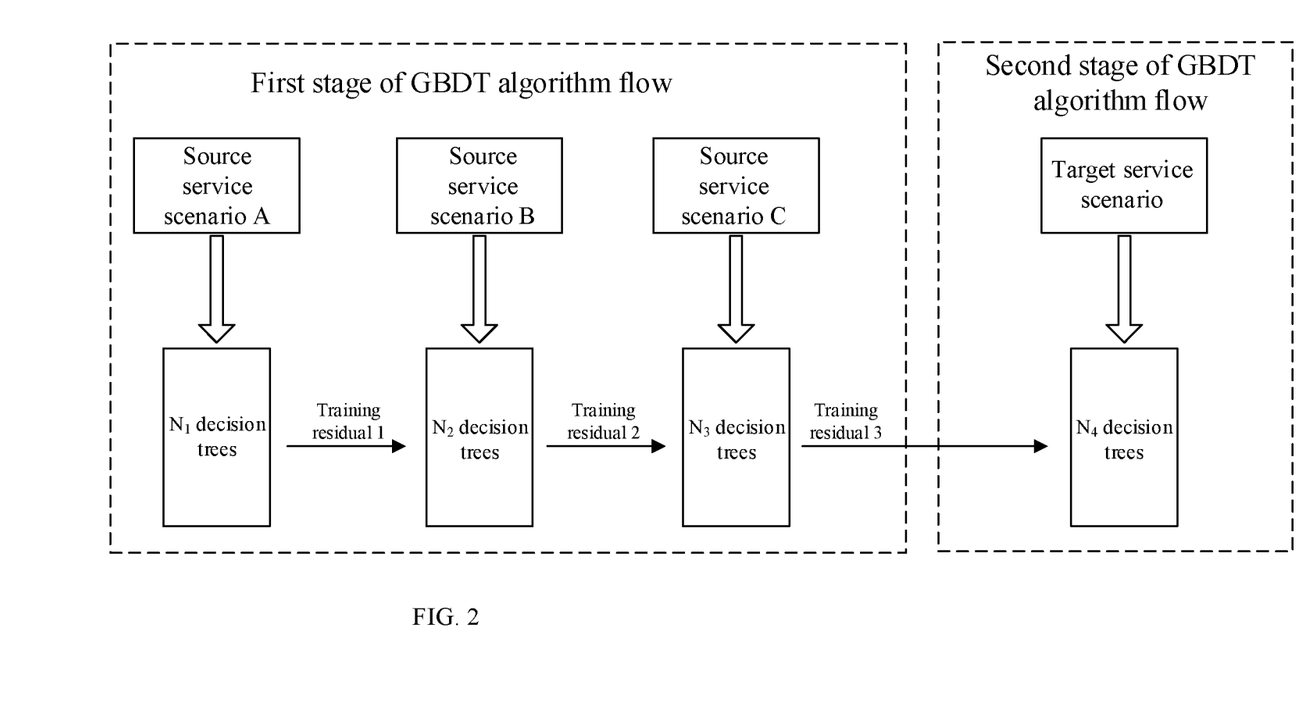
FIG. 2 is a schematic diagram illustrating an architecture of a solution according to an implementation of the present specification.

FIG. 2 is a schematic diagram illustrating an architecture of a solution according to an implementation of the present specification. As shown in FIG. 2, the training in the first stage in the GBDT algorithm flow is performed by using the data of more than one source service scenario (three source service scenarios are used as an example in the figure), and then the training in the second stage is performed by using the data of the target service scenarios, to fit the training residual generated in the first stage and finally obtain the model.

As shown in FIG. 2, the GBDT algorithm flow is executed by using the data accumulated by using source service scenario A, and when the number of decision trees trained by using the data accumulated in source service scenario A reaches $N_1$, the current training residual is calculated, which is denoted as training residual 1. Then, the GBDT algorithm flow continues to be executed based on training residual 1 by using data accumulated in source service scenario B. When the number of decision trees trained by using the data accumulated in source service scenario B reaches $N_2$, the current training residual is calculated, which is denoted as training residual 2. Then, the GBDT algorithm flow continues to be executed based on training residual 2 by using data accumulated in source service scenario C. When the number of decision trees trained by using the data accumulated in source service scenario C reaches $N_3$, the current training residual is calculated, which is denoted as training residual 3. As such, the first stage is completed. It can be seen that in FIG. 2, training residual 3 is actually the training residual to be inherited in the second stage (namely, the training residual described in step S108).

In the second stage, the GBDT algorithm flow continues to be executed based on training residual 3 by using the target service scenario. When the number of decision trees trained by using the data accumulated in the target service scenario reaches $N_4$, the training is stopped.

Figure 3:
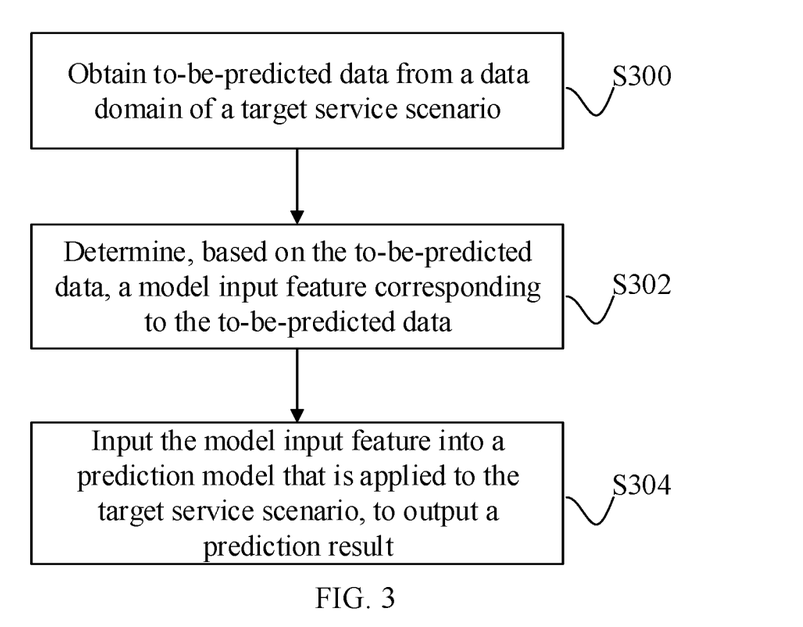
FIG. 3 is a schematic flowchart illustrating a prediction method according to an implementation of the present specification.

FIG. 3 is a schematic flowchart illustrating a prediction method according to an implementation of the present specification. The method includes the following steps.

S300: Obtain to-be-predicted data from a data domain of a target service scenario.

S302: Determine, based on the to-be-predicted data, a model input feature corresponding to the to-be-predicted data.

S304: Input the model input feature into a prediction model that is applied to the target service scenario, to output a prediction result.

The prediction model is obtained by using the training method shown in FIG. 1.

Figure 4:
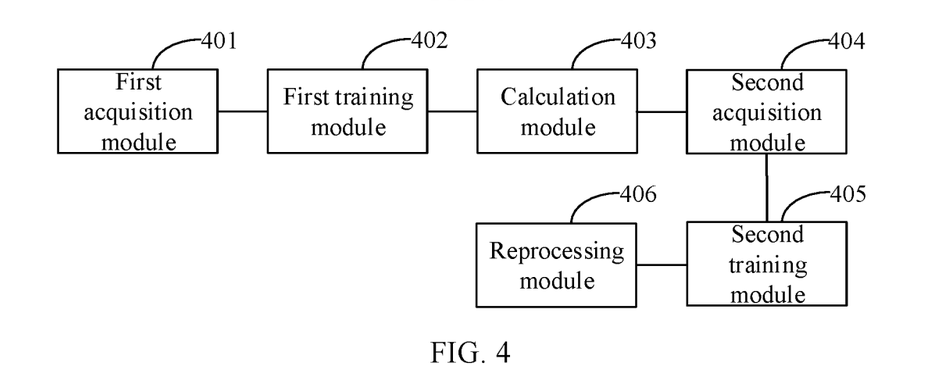
FIG. 4 is a schematic structural diagram illustrating a model training apparatus based on GBDT according to an implementation of the present specification.

Based on the model training method shown in FIG. 1, an implementation of the present specification further correspondingly provides a model training apparatus based on GBDT for training a target model to be applied to a target service scenario. As shown in FIG. 4, the apparatus includes: a first acquisition module 401, configured to obtain a first sample set, the first sample set being a set of labeled samples obtained from a data domain of a source service scenario, and the source service scenario being a service scenario similar to the target service scenario; a first training module

402, configured to execute a GBDT algorithm flow by using the first sample set, and sequentially training at least one "pre" decision tree until a predetermined or dynamically-determined training suspension condition is met; a calculation module 403, configured to determine training residual based on the decision tree(s) trained by using the first sample set; a second acquisition module 404, configured to obtain a second sample set, the second sample set being a set of labeled samples obtained from a data domain of the target service scenario; and a second training module 405, configured to continue to execute the GBDT algorithm flow based on the training residual by using the second sample set, and sequentially training at least one "post" decision tree until a predetermined or dynamically-determined training stop condition is met; where the target model is obtained by integrating the trained decision trees.

The training suspension condition specifically includes: the number of the decision trees trained by using the first sample set reaches a first pre-specified or dynamically-determined number.

The training stop condition specifically includes: the number of the decision trees trained by using the first sample set reaches a second pre-specified or dynamically-determined number.

The apparatus further includes: a reprocessing module 406, configured to: before the continuing to execute the GBDT algorithm flow based on the training residual by using the second sample set, obtain a third sample set, the third sample set being a set of labeled samples obtained from a data domain of another source service scenario; continue to execute the GBDT algorithm flow based on the training residual by using the third sample set, and sequentially train at least one decision tree until a predetermined or dynamically-determined training re-suspension condition is met; and re-determine the training residual based on the decision tree(s) trained by using the first sample set and the decision tree(s) trained by using the third sample set.

The training re-suspension condition includes: the number of the decision trees trained by using the third sample set reaches a third pre-specified or dynamically-determined number.

Figure 5:
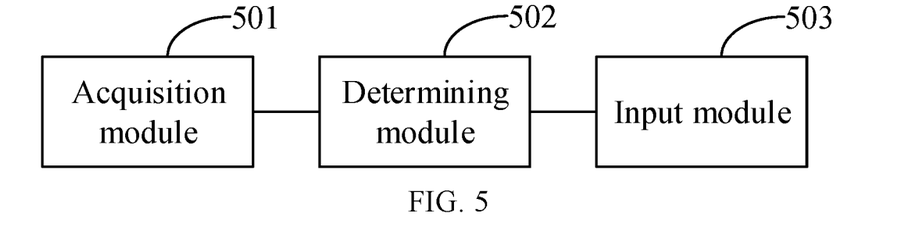
FIG. 5 is a schematic structural diagram illustrating a prediction apparatus according to an implementation of the present specification.

Based on the prediction method shown in FIG. 3, an implementation of the present specification further correspondingly provides a prediction apparatus. As shown in FIG. 5, the apparatus includes an acquisition module 501, configured to obtain to-be-predicted data from a data domain of a target service scenario; a determining module 502, configured to determine, based on the to-be-predicted data, a model input feature corresponding to the to-be-predicted data; and an input module 503, configured to input the model input feature into a prediction model that is applied to the target service scenario, to output a prediction result, the prediction model being obtained by using the method shown in FIG. 1.

An implementation of the present specification further provides a computer device, including at least a memory, a processor, and a computer program stored in the memory and executable on the processor, where the processor implements the method shown in FIG. 1 when executing the program.

Figure 6:
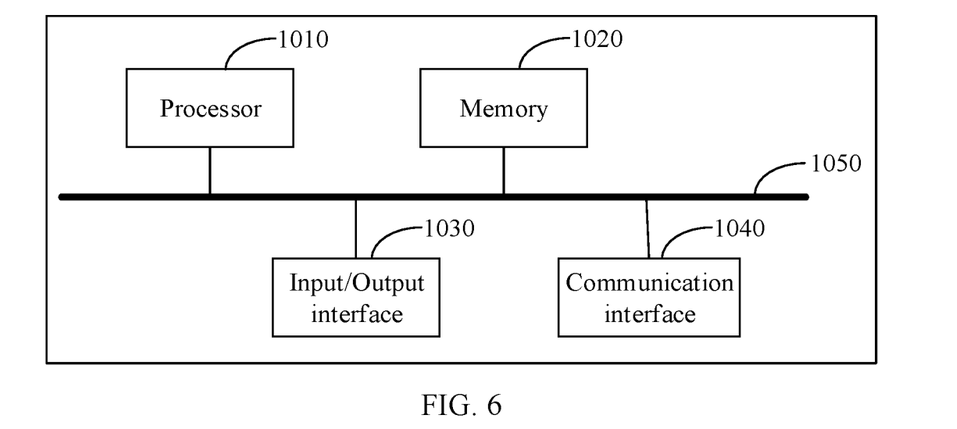
FIG. 6 is a schematic structural diagram illustrating a device for configuring a method according to an implementation of the present specification.

FIG. 6 is a more specific schematic diagram of a hardware structure of a computing device according to an implementation of the present specification. The device can include: a processor 1010, a memory 1020, an input/output interface 1030, a communication interface 1040, and a bus 1050. The processor 1010, the memory 1020, the input/output interface 1030, and the communication interface 1040 are communicatively connected to each other within the device by using the bus 1050.

The processor 1010 can be implemented by a general-purpose central processing unit (CPU), a microprocessor, an application specific integrated circuit (ASIC), one or more integrated circuits, or the like, and is configured to execute a relevant program to implement the technical solution according to the implementation of the present specification.

The memory 1020 can be implemented in the form of a read only memory (ROM), a random access memory (RAM), a static storage device, a dynamic storage device, or the like. The memory 1020 can store an operating system and other application programs. When the technical solution according to the implementation of the present specification is implemented by software or firmware, relevant program code is stored in the memory 1020, and invoked and executed by the processor 1010.

The input/output interface 1030 is configured to connect an input/output module to input and output information. An input/output module can be disposed as a component in the device (not shown in the figure), or can be externally connected to the device to provide corresponding functions. Input devices can include a keyboard, a mouse, a touch screen, a microphone, various sensors, and the like, and output devices can include a display, a loudspeaker, a vibrator, an indicator, and the like.

The communication interface 1040 is configured to connect a communication module (not shown in the figure) to implement communication interaction between the device and other devices. The communication module can communicate in a wired way (such as a USB and a network cable) or a wireless way (such as a mobile network, Wi-Fi, and Bluetooth).

The bus 1050 includes a path for transferring information between various components (such as the processor 1010, the memory 1020, the input/output interface 1030, and the communication interface 1040) of the device.

It should be noted that although only the processor 1010, the memory 1020, the input/output interface 1030, the communication interface 1040, and the bus 1050 of the above device are shown, during specific implementation, the device can also include other components necessary for normal operation. In addition, it can be understood by a person skilled in the art that the above device can also include only the components necessary for implementing the solutions according to the implementations of the present specification, and need not include all the components shown in the drawings.

An implementation of the present specification further provides a computer-readable storage medium storing a computer program, where when the program is executed by a processor, the method shown in FIG. 1 is implemented.

Computer readable media include permanent and non-permanent, removable and non-removable media. Information can be stored by using any method or technology. Information can be computer readable instructions, data structures, modules of programs, or other data. Examples of storage media of the computer include, but are not limited to, a phase change RAM (PRAM), a static RAM (SRAM), a dynamic RAM (DRAM), other types of RAMs, a read only memory (ROM), an electrically erasable programmable ROM (EEPROM), a flash memory or other memory technologies, a read only optical disk ROM (CD-ROM), a digital versatile disk (DVD) or other optical storage, magnetic cassettes, magnetic tape magnetic disk storage or other magnetic storage devices or any other non-transmission medium, which can be used to store information accessible by computing devices. As defined herein, computer readable media do not include transitory computer readable media such as modulated data signals and carrier waves.

Through the description of the above implementations, a person skilled in the art can clearly understand that the implementations of the present specification can be implemented by using software and a necessary general hardware platform. Based on such an understanding, the technical solutions of implementations of the present specification essentially or the part contributing to the existing technologies can be embodied in a form of a software product. The computer software product can be stored in a storage medium, such as an ROM/RAM, a magnetic disk or an optical disk, and includes several instructions for instructing a computer device (which can be a personal computer, a server, a network device, or the like) to perform the methods described in the implementations of the present specification or in certain parts of the implementations of the present specification.

The systems, methods, modules or units illustrated in the above implementations can be implemented by computer chips or entities, or by products with certain functions. A typical implementation device is a computer. The computer can be a personal computer, a laptop computer, a cellular phone, a camera phone, a smartphone, a personal digital assistant, a media player, a navigation device, an email sending and receiving device, a game console, a tablet computer, a wearable device, or a combination thereof.

Each implementation in the present specification is described in a progressive way, and the same or similar parts between the implementations can be referred to each other. Each implementation focuses on differences from other implementations. In particular, because the apparatus implementation is basically similar to the method implementation, the description is relatively simple, and for the relevant parts, references can be made to partial descriptions of the method implementation. The method implementations described above are only illustrative, where the modules described as separate components can or cannot be physically separated, and the functions of each module can be implemented in one or more pieces of software and/or hardware when the solutions according to the implementations of the present specification are implemented. Some or all of the modules can also be selected based on actual needs to achieve the object of the solution of this implementation. A person of ordinary skill in the art can understand and implement the implementations without innovative efforts.

The above is only specific implementations of the present specification. It should be pointed out that, a person of ordinary skill in the art can further make several improvements and modifications without departing from the principle of implementations of the present specification, and such improvements and modifications shall fall within the protection scope of implementations of the present specification.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A machine learning model training method based on gradient boosting decision tree (GBDT), comprising:
   obtaining a first sample set, the first sample set being a set of labeled samples obtained from a data domain of a source service scenario, and the data domain of the source service scenario including data features that overlap with a data domain of a target service scenario;
   executing a GBDT algorithm by using the first sample set, and sequentially training a first plurality of decision trees until a training suspension condition is met;
   determining training residual based on the first plurality of decision trees trained by using the first sample set;
   obtaining a second sample set, the second sample set being a set of labeled samples obtained from the data domain of the target service scenario;
   based on the training residual, continuing to execute the GBDT algorithm flow by using the second sample set, and sequentially training a second plurality of decision trees until a training stop condition is met; and
   obtaining a target model by integrating at least the first plurality and second plurality of decision trees.

2. The method according to claim 1, wherein the training suspension condition includes:
   the number of the decision trees trained by using the first sample set reaches a first number.

3. The method according to claim 1, wherein the training stop condition includes:
   the number of the decision trees trained by using the second sample set reaches a second number.

4. The method according to claim 1, further comprising:
   before the continuing to execute the GBDT algorithm by using the second sample set, obtaining a third sample set, the third sample set being a set of labeled samples obtained from a data domain of another source service scenario;
   based on the training residual, continuing to execute the GBDT algorithm by using the third sample set, and sequentially training a third plurality of decision trees until a training re-suspension condition is met; and
   re-determining the training residual based on the first plurality of decision trees trained by using the first sample set and the third plurality of decision trees trained by using the third sample set.

5. The method according to claim 4, wherein the training re-suspension condition includes:
   the number of the decision trees trained by using the third sample set reaches a third number.

6. The method according to claim 1, further comprising:
   determining at least one to-be-predicted data feature from the data domain of the target service scenario;
   determining, based on the at least one to-be-predicted data feature, one or more model input features; and
   inputting the one or more model input features into the target model to output a prediction result.

7. An apparatus, comprising:
   a first acquisition module, configured to obtain a first sample set, the first sample set being a set of labeled samples obtained from a data domain of a source service scenario, and the data domain of the source service scenario including data features that overlap with a data domain of a target service scenario;
a first training module, configured to execute a gradient boosting decision tree (GBDT) algorithm by using the first sample set, to train at least one decision tree until a training suspension condition is met;
a calculation module, configured to determine training residual based on the at least one decision tree trained by using the first sample set;
a second acquisition module, configured to obtain a second sample set, the second sample set being a set of labeled samples obtained from the data domain of the target service scenario; and
a second training module, configured to continue to execute the GBDT algorithm based on the training residual and by using the second sample set, to train at least one decision tree until a training stop condition is met,
wherein a target model is obtained by integrating the trained decision trees.

8. The apparatus according to claim 7, wherein the training suspension condition includes:
the number of the at least one decision tree trained by using the first sample set reaches a first number.

9. The apparatus according to claim 7, wherein the training stop condition includes:
the number of the at least one decision tree trained by using the first sample set reaches a second number.

10. The apparatus according to claim 7, further including:
a reprocessing module, configured to:
before the continuing to execute the GBDT algorithm based on the training residual and by using the second sample set, obtain a third sample set, the third sample set being a set of labeled samples obtained from a data domain of another source service scenario;
continue to execute the GBDT algorithm based on the training residual and by using the third sample set, to train at least one decision tree until a training re-suspension condition is met; and
re-determine the training residual based on the at least one decision tree trained by using the first sample set and the at least one decision tree trained by using the third sample set.

11. The apparatus according to claim 10, wherein the training re-suspension condition includes:
the number of the at least one decision tree trained by using the third sample set reaches a third number.

12. The apparatus according to claim 7, further comprising:
an acquisition module, configured to determine at least one to-be-predicted data feature from a data domain of the target service scenario;
a determining module, configured to determine, based on the at least one to-be-predicted data feature, at least one model input feature; and
an input module, configured to input the at least one model input feature into the target model to output a prediction result.

13. A non-transitory storage medium storing contents that, when executed by one or more processors, cause the one or more processors to perform actions comprising:
obtaining a first sample set, the first sample set being a set of labeled samples obtained from a data domain of a source service scenario;
executing a gradient boosting decision tree (GBDT) algorithm by using the first sample set, and training at least one decision tree until a training suspension condition is met;
determining training residual based on the at least one decision tree trained by using the first sample set;
obtaining a second sample set, the second sample set being a set of labeled samples obtained from a data domain of a target service scenario;
based on the training residual, continuing to execute the GBDT algorithm by using the second sample set, and training at least one decision tree until a training stop condition is met; and
obtaining a target model by integrating the decision trees trained by using the first sample set and second sample set.

14. The storage medium according to claim 13, wherein the training suspension condition includes:
the number of the at least one decision tree trained by using the first sample set reaches a first number.

15. The storage medium according to claim 13, wherein the training stop condition includes:
the number of the at least one decision tree trained by using the second sample set reaches a second number.

16. The storage medium according to claim 13, wherein the actions further comprise:
before the continuing to execute the GBDT algorithm by using the second sample set, obtaining a third sample set, the third sample set being a set of labeled samples obtained from a data domain of another source service scenario;
based on the training residual, continuing to execute the GBDT algorithm by using the third sample set, and training at least one decision tree until a training re-suspension condition is met; and
re-determining the training residual based on the at least one decision tree trained by using the first sample set and the at least one decision tree trained by using the third sample set.

17. The storage medium according to claim 16, wherein the training re-suspension condition includes:
the number of the at least one decision tree trained by using the third sample set reaches a third number.

18. The storage medium according to claim 13, wherein the actions further comprise:
determining at least one to-be-predicted data feature from the data domain of the target service scenario;
determining, based on the at least one to-be-predicted data feature, one or more model input features; and
inputting the one or more model input features into the target model to output a prediction result.

* * * * *